US011792008B2

(12) United States Patent
Fattal et al.

(10) Patent No.: US 11,792,008 B2
(45) Date of Patent: Oct. 17, 2023

(54) ACTIVELY MONITORING ENCRYPTED TRAFFIC BY INSPECTING LOGS

(71) Applicant: SILVERFORT LTD., Tel Aviv (IL)

(72) Inventors: Matan Binyamin Fattal, Raanana (IL); Yaron Kassner, Hod Hasharon (IL); Hed Kovetz, Atzmon-Segev (IL); Rotem Zach, Pardesiya (IL)

(73) Assignee: SILVERFORT LTD., Tel Aviv (IL)

( * ) Notice: Subject to any disclaimer, the term of this patent is extended or adjusted under 35 U.S.C. 154(b) by 218 days.

(21) Appl. No.: 16/612,422

(22) PCT Filed: Jun. 19, 2018

(86) PCT No.: PCT/IB2018/054491
§ 371 (c)(1),
(2) Date: Nov. 11, 2019

(87) PCT Pub. No.: WO2018/234980
PCT Pub. Date: Dec. 27, 2018

(65) Prior Publication Data
US 2020/0213116 A1    Jul. 2, 2020

Related U.S. Application Data

(60) Provisional application No. 62/521,576, filed on Jun. 19, 2017.

(51) Int. Cl.
*H04L 9/32* (2006.01)
*H04L 9/40* (2022.01)
*H04W 12/06* (2021.01)

(52) U.S. Cl.
CPC .......... *H04L 9/3213* (2013.01); *H04L 9/3271* (2013.01); *H04L 63/0815* (2013.01);
(Continued)

(58) Field of Classification Search
CPC ... H04L 9/3213; H04L 63/10; H04L 63/0815; H04L 9/3271; H04L 63/20;
(Continued)

(56) References Cited

U.S. PATENT DOCUMENTS 6,405,318 B1    6/2002   Rowland
7,958,347 B1    6/2011   Ferguson
(Continued)

FOREIGN PATENT DOCUMENTS

WO    2018096471 A1    5/2018

OTHER PUBLICATIONS

EP Application # 18819885.7 Search Report dated Feb. 11, 2021.
(Continued)

*Primary Examiner* — William J. Goodchild
(74) *Attorney, Agent, or Firm* — KLIGLER & ASSOCIATES PATENT ATTORNEYS LTD

(57) ABSTRACT

A system (20) includes a network interface (32) and a processor (34). The processor is configured to (i) receive, via the network interface, a request originating from a request-origin application and directed to a request-destination application (24b) that runs on a request-destination device (24), (ii) subsequently to receiving the request, communicate the request to the request-destination device, (iii) subsequently to communicating the request to the request-destination device, receive a response, from the request-destination application, to the request, (iv) while holding the response, identify information contained in at least one log entry that was recorded by the request-destination application responsively to the request, and (v) perform a function in response to the information. Other embodiments are also described.

42 Claims, 4 Drawing Sheets

(52) U.S. Cl.
CPC .......... *H04L 63/10* (2013.01); *H04L 63/1425* (2013.01); *H04L 63/20* (2013.01); *H04W 12/06* (2013.01)

(58) Field of Classification Search
CPC ............. H04L 63/1425; H04L 63/0281; H04L 63/0807; H04L 29/06911; H04L 29/06925; H04L 29/06931; H04L 29/06938; H04W 12/06
See application file for complete search history.

(56) References Cited

U.S. PATENT DOCUMENTS

| | | | |
|---|---|---|---|
| 8,127,345 | B2 | 2/2012 | Gregg et al. |
| 9,009,825 | B1 | 4/2015 | Chang et al. |
| 9,024,720 | B2 | 5/2015 | Bliding et al. |
| 9,191,381 | B1 | 11/2015 | Popp et al. |
| 10,051,001 | B1 | 8/2018 | Ashley et al. |
| 10,713,280 | B2 † | 7/2020 | Horowitz |
| 10,740,353 | B2 † | 8/2020 | Horowitz |
| 2003/0208562 | A1* | 11/2003 | Hauck ............... H04L 67/02 709/219 |
| 2004/0249907 | A1 | 12/2004 | Brubacher et al. |
| 2005/0278384 | A1 | 12/2005 | Lin et al. |
| 2006/0064503 | A1* | 3/2006 | Brown ............... H04L 67/02 709/238 |
| 2006/0179140 | A1 | 8/2006 | John et al. |
| 2006/0184792 | A1* | 8/2006 | Berlin ............... G06F 21/51 713/165 |
| 2006/0236370 | A1* | 10/2006 | John ............... H04L 61/00 726/1 |
| 2012/0113857 | A1* | 5/2012 | Narayanaswamy .... H04L 43/18 370/252 |
| 2013/0007239 | A1 | 1/2013 | Agarwal et al. |
| 2013/0239166 | A1* | 9/2013 | MacLeod ............ G06F 21/6218 726/4 |
| 2014/0157393 | A1 | 6/2014 | Whitcomb |
| 2014/0359694 | A1 | 12/2014 | MaxWell et al. |
| 2016/0087957 | A1 | 3/2016 | Shah et al. |
| 2017/0141975 | A1 | 5/2017 | John et al. |
| 2017/0244730 | A1 | 8/2017 | Sancheti et al. |
| 2017/0286516 | A1 † | 10/2017 | Horowitz |
| 2017/0286518 | A1 † | 10/2017 | Horowitz |
| 2017/0310659 | A1 | 10/2017 | Pranam et al. |
| 2017/0346830 | A1* | 11/2017 | Goldfarb ............ H04L 67/01 |
| 2019/0036924 | A1 | 1/2019 | Wang et al. |

OTHER PUBLICATIONS

International Application # PCT/IB2018/054491 search report dated Sep. 5, 2018.
Microsoft Docs, "Integrate your existing NPS infrastructure with Azure Multi-Factor Authentication", pp. 1-10, Aug. 14, 2017.
European Application # 17873015.6 search report dated Apr. 28, 2020.
Sherry et al., "Making Middleboxes Someone Else's Problem: Network Processing as a Cloud Service", Proceedings of the ACM SIGCOMM 2012 conference on Applications, technologies, architectures, and protocols for computer communication, pp. 13-24, Helsinki, Finland, Aug. 13-17, 2012.
International Application # PCT/IB2019/061083 search report dated Mar. 17, 2020.
ImperialViolet—Security Keys, pp. 1-17, Mar. 27, 2018.
Reddit, "Centralized Authentication Server with U2F Keys", pp. 1-5, Jul. 15, 2019 https://www.reddit.com/r/selfhosted/comments/bd2jyu/centralized_authentication_server_with_u2f_keys/.
GitHub, "U2F security token emulator written in Rust", pp. 1-3, Jul. 15, 2019 https://github.com/danstiner/rust-u2f.
Wright et al., "Bringing U2F to the Masses", pp. 1-12, Feb. 24, 2017.
U.S. Appl. No. 16/419,017 Office Action dated Feb. 14, 2022.

\* cited by examiner
† cited by third party

ACTIVELY MONITORING ENCRYPTED TRAFFIC BY INSPECTING LOGS

CROSS-REFERENCE TO RELATED APPLICATION

The present application claims the benefit of U.S. Provisional Application No. 62/521,576, entitled "Log-Assisted Network Analyzer," filed Jun. 19, 2017, whose disclosure is incorporated herein by reference.

FIELD OF THE INVENTION

The present invention relates to the protection of computer resources, e.g., on a computer network, from unauthorized or malicious entities.

BACKGROUND

U.S. Pat. No. 6,405,318 describes a computer-implemented intrusion detection system and method that monitors a computer system in real-time for activity indicative of attempted or actual access by unauthorized persons or computers. The system detects unauthorized users attempting to enter into a computer system by comparing user behavior to a user profile, detects events that indicate an unauthorized entry into the computer system, notifies a control function about the unauthorized users and events that indicate unauthorized entry into the computer system and has a control function that automatically takes action in response to the event. The user profiles are dynamically constructed for each computer user when the computer user first attempts to log into the computer system and upon subsequent logins, the user's profile is dynamically updated. By comparing user behavior to the dynamically built user profile, false alarms are reduced. The system also includes a log auditing function, a port scan detector and a session monitor function.

International Application Publication WO/2018/096471 to Fattal et al., whose disclosure is incorporated herein by reference, describes an apparatus comprising a network interface and a processor. The processor is configured to run a request-destination application, and, by executing network-layer software that does not include the request-destination application, (i) receive, via the network interface, a request, originating from a request-origin device, to access a resource, the request being directed to the request-destination application, (ii) subsequently to receiving the request, decide to forward the request to a traffic-management server before communicating the request to the request-destination application, (iii) in response to the deciding, forward the request, over a computer network, to the traffic-management server, (iv) subsequently to forwarding the request, receive the request from the traffic-management server, and (v) subsequently to receiving the request from the traffic-management server, communicate the request to the request-destination application.

SUMMARY OF THE INVENTION

There is provided, in accordance with some embodiments of the present invention, a system that includes a network interface and a processor. The processor is configured to receive, via the network interface, a request originating from a request-origin application and directed to a request-destination application that runs on a request-destination device. The processor is further configured to, subsequently to receiving the request, communicate the request to the request-destination device. The processor is further configured to, subsequently to communicating the request to the request-destination device, receive a response, from the request-destination application, to the request. The processor is further configured to, while holding the response, identify information contained in at least one log entry that was recorded by the request-destination application responsively to the request, and to perform a function in response to the information.

In some embodiments, the request includes a request to access a resource.

In some embodiments, the request includes an authentication request.

In some embodiments, the authentication request uses a Kerberos protocol and is encrypted using Flexible Authentication Secure Tunneling (FAST), and the request-destination application includes a Kerberos Key Distribution Center (KDC).

In some embodiments, the authentication request uses a Netlogon protocol, the request-destination device includes a Domain Controller in a Windows domain, and the request-destination application includes Active Directory Domain Services.

In some embodiments, the request includes a request to verify that a user is authorized to access a resource.

In some embodiments, the processor is further configured to, subsequently to communicating the request to the request-destination device, receive the at least one log entry from the request-destination device.

In some embodiments, the processor is configured to receive the request from the request-destination device.

In some embodiments, the request-origin application runs on a request-origin device, and the processor is configured to receive the request from the request-origin device.

In some embodiments, the request is encrypted, and the processor is configured to perform the function without first decrypting the request.

In some embodiments, the response is encrypted, and the processor is configured to perform the function without first decrypting the response.

In some embodiments, the processor is configured to, in performing the function, while holding the response, request authentication from a user who submitted the request.

In some embodiments, the processor is configured to, in performing the function, while holding the response, request approval of the request from an individual other than a user who submitted the request.

In some embodiments, the response indicates that the request was approved, and the processor is configured to, in performing the function, prevent the response from being communicated to the request-origin application.

In some embodiments, the request belongs to a communication session, and the processor is further configured to, in performing the function, cause the communication session to terminate.

In some embodiments, the processor is further configured to, subsequently to identifying the information, cause the response to be communicated to the request-origin application.

In some embodiments, the processor is configured to cause the response to be communicated to the request-origin application by communicating the response to the request-destination device for forwarding to the request-origin application.

In some embodiments, the request-origin application runs on a request-origin device, and the processor is configured to cause the response to be communicated to the request-origin application by communicating the response to the request-origin device.

In some embodiments, the processor is configured to, in performing the function, prior to causing the response to be communicated to the request-origin application, alter the response.

In some embodiments, the response initially indicates that the request was approved, and the processor is configured to alter the response to indicate that the request was denied.

In some embodiments, the response indicates that the request was approved and allows the request-origin application to access a resource, and the processor is configured to, in performing the function, subsequently to causing the response to be communicated to the request-origin application, terminate access of the request-origin application to the resource after a predetermined amount of time.

In some embodiments, the information includes an identity of a user who submitted the request.

In some embodiments, the log entry includes a Windows Event Log entry.

In some embodiments, the log entry is included among multiple log entries entered by the request-destination application, and the processor is further configured to identify the log entry, from among the multiple log entries, as pertaining to the request, prior to identifying the information.

In some embodiments, the processor is further configured to, prior to communicating the request to the request-destination device, record metadata that are associated with the request, and the processor is configured to identify the log entry from among the multiple log entries by identifying the recorded metadata in the log entry.

In some embodiments, the metadata include a session identifier.

In some embodiments, the processor is further configured to, prior to communicating the request to the request-destination device, modify the request to include a particular marker, and the processor is configured to identify the log entry from among the multiple log entries by identifying the particular marker in the log entry.

In some embodiments, the processor is configured to identify the log entry from among the multiple log entries by identifying, in the log entry, an identifier of a communication interface via which the request was communicated to the request-destination device.

In some embodiments, the processor is configured to identify the log entry from among the multiple log entries by identifying a correspondence between a log-entry time of the log entry and a request-communication time at which the request was communicated to the request-destination device.

In some embodiments,
the request is a first request, and
the processor is further configured to:
subsequently to communicating the first request, receive a second request directed to the request-destination device, and
refrain from communicating the second request to the request-destination device before the log entry is entered.

There is further provided, in accordance with some embodiments of the present invention, a system, that includes a network interface and a processor. The processor is configured to receive, from a security application, a request originating from a request-origin application and directed to a request-destination application. The processor is further configured to, subsequently to receiving the request, communicate the request to the request-destination application. The processor is further configured to, subsequently to communicating the request to the request-destination application, receive a response, from the request-destination application, to the request, and to communicate the response, and at least one log entry recorded by the request-destination application responsively to the request, to the security application, without communicating the response to the request-origin application.

In some embodiments, the processor is further configured to, prior to receiving the request from the security application, receive the request from the request-origin application, and to forward the request to the security application.

In some embodiments, the request uses a Netlogon protocol, and the request-destination application includes Active Directory Domain Services running on a Domain Controller in a Windows domain.

There is further provided, in accordance with some embodiments of the present invention, a method that includes receiving a request originating from a request-origin application and directed to a request-destination application that runs on a request-destination device. The method further includes, subsequently to receiving the request, communicating the request to the request-destination device. The method further includes, subsequently to communicating the request to the request-destination device, receiving a response, from the request-destination application, to the request. The method further includes, while holding the response, identifying information contained in at least one log entry that was recorded by the request-destination application responsively to the request, and performing a function in response to the information.

There is further provided, in accordance with some embodiments of the present invention, a method that includes receiving, from a security application, a request originating from a request-origin application and directed to a request-destination application. The method further includes, subsequently to receiving the request, communicating the request to the request-destination application. The method further includes, subsequently to communicating the request to the request-destination application, receiving a response, from the request-destination application, to the request. The method further includes communicating the response, and at least one log entry recorded by the request-destination application responsively to the request, to the security application, without communicating the response to the request-origin application.

The present invention will be more fully understood from the following detailed description of embodiments thereof, taken together with the drawings, in which:

DETAILED DESCRIPTION OF EMBODIMENTS

Overview

Figure 1:
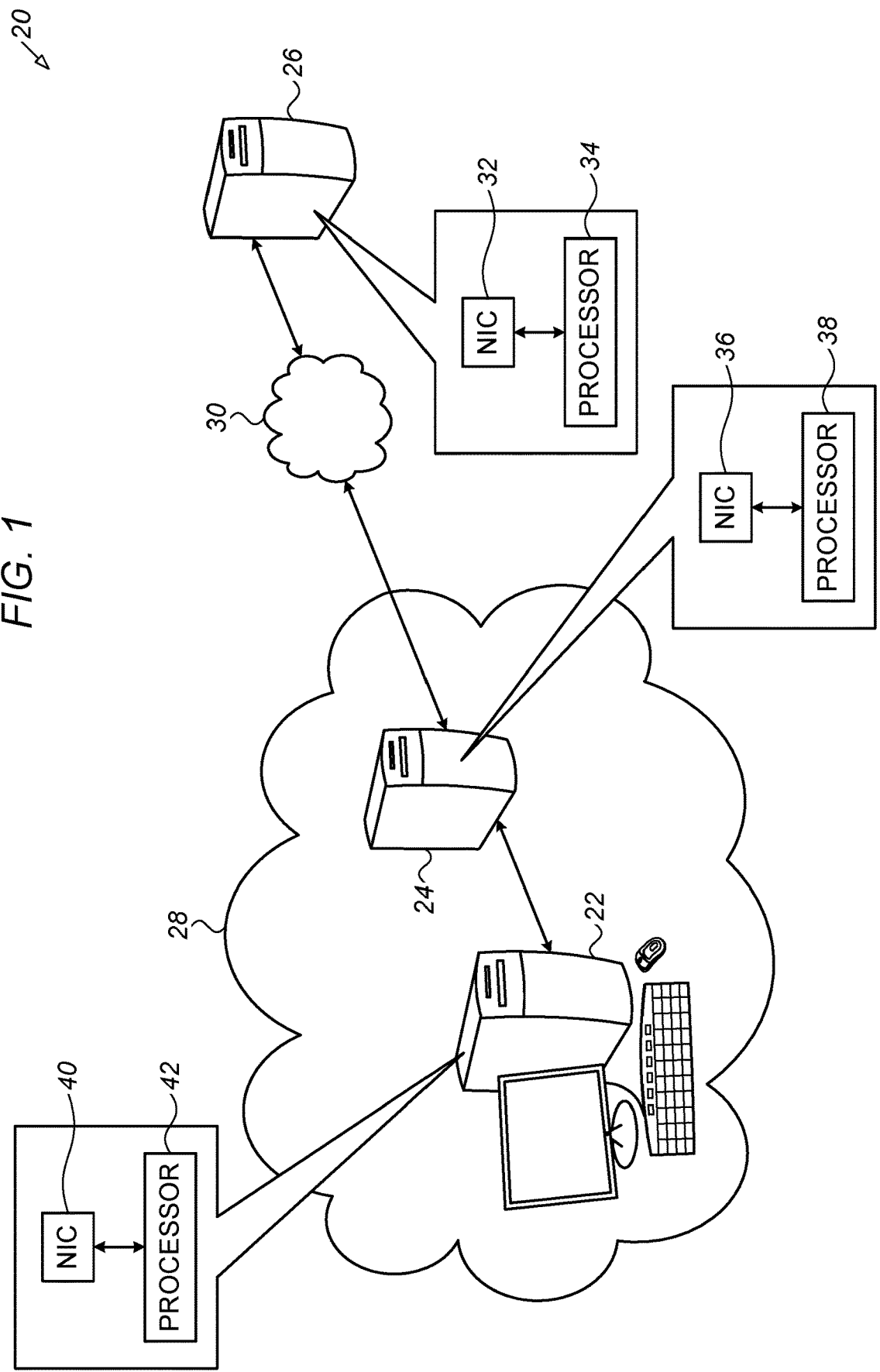
FIG. 1 is a schematic illustration of a system for managing requests and the responses to such requests, in accordance with some embodiments of the present invention.

In general, it is challenging to defend a computer network from malicious or other unauthorized users. In theory, advanced security capabilities may be added to all relevant servers on the network. However, some networks may include tens, hundreds, or even thousands of servers, and it may be difficult to modify the native functionality of some or all of these servers.

Another option—instead of adding the desired security capabilities to the servers themselves—is to deploy a separate security system that secures the entire network. However, it may be challenging for such a system to monitor encrypted traffic that is passed over the network. In theory, the system can intercept the traffic, decrypt the traffic, inspect the traffic, re-encrypt the traffic, and then pass the traffic to its intended destination. However, the decryption of the traffic may expose the network to additional security risks. Moreover, to enable decryption of the traffic, the system must be provided with any required encryption keys and/or certificates, which may be difficult to securely transfer and store.

To address this challenge, embodiments of the present invention provide a network security system that receives, in real-time, the encrypted traffic belonging to the session, along with the unencrypted log entries that are updated as the session proceeds. Based on the relevant information contained in the log entries, the system may control the session, such as to implement any appropriate security measure. Thus, advantageously, the system does not need to decrypt any of the traffic. This technique may be used, for example, to actively monitor communication sessions involving various types of requests, such as a request to authenticate, a request to access a resource, or an authorization request (i.e., a request to verify that a user is authorized to access a resource).

More specifically, the system first allows part of the session to proceed normally, such that some log entries pertaining to the session are generated. Subsequently, the system pauses the session until the relevant log entries, which contain information that cannot be ascertained from the session itself (due to the encryption of the session), are collected and examined. The system may then decide, based on the log entries, whether to apply additional security measures. For example, based on the information contained in the log entries, the system may terminate the session, allow the session to continue normally, modify one or more packets belonging to the session, or require additional authentication before allowing the session to continue.

For example, the system may allow a request sent from a client to a server to pass through, but then hold the response that is sent from the server to the client. While the response is held, the system may inspect the relevant log entries pertaining to the request. To facilitate this functionality, the system may reside physically or logically between the client and the server, such that all communication between the client and the server passes through the system. Alternatively, the server may be configured to forward any received requests to the system before the relevant request-processing application receives these requests, and to additionally communicate the responses from the request-processing application to the system, instead of communicating these responses directly to the client.

One application of embodiments described herein is the securing of resources on a Windows domain. For example, the system may provide an added level of security for authentication requests that are sent by Windows servers, using the encrypted Netlogon protocol, to Active Directory Domain Services (ADDS) running on a Domain Controller (DC). (In this case, the relevant Windows server is the "client" described in the previous paragraph, while the DC is the "server.") Since decrypting the Netlogon protocol may introduce significant network security risks, and since the ADDS log all received authentication requests in the Windows Event Log, embodiments of the present invention are particularly advantageous for such applications.

As another example, the system may provide an added level of security for access requests sent over the Internet to a cloud-infrastructure device. Alternatively, the system may implement security measures for access requests sent over the Internet to a web server, e.g., using the Hypertext Transfer Protocol Secure (HTTPS) protocol. In this case, the logging may be performed by the application to which access is requested, or by a central log service, such as that of a Single Sign-On Solution or a Cloud Access Security Broker.

As another example, the system may provide an added level of security for Kerberos authentication requests, such as AS_REQ and TGS_REQ requests, that are sent to a Kerberos Key Distribution Center (KDC). (Such requests may be encrypted (or "armored") using Flexible Authentication Secure Tunneling (FAST).) For such requests, relevant log entries may be obtained, for example, from the Windows Event Log.

Typically, when actively monitoring a session, the system first receives, from the client or the server, a request that originates from the client and is directed to the relevant request-processing application. (Typically, but not necessarily, this request is encrypted.) Subsequently, the system records metadata associated with the request (e.g., a session identifier, the time of the request, and/or the network address from which the request was sent), and then communicates the request to the server for processing by the request-processing application. The request-processing application then generates a response to the request, and also records, in a log file, various parameters of the request, such as the name of the user who submitted the request, the client hostname, the time of the request, whether the request was approved, and, for an access request or authorization request, the name of the requested resource. The server then communicates the response, and the log file (or at least the relevant log entries), to the system.

Subsequently, while refraining from passing the response to the client, the system identifies at least one log entry that pertains to the request, by identifying, in the log entry, the metadata that were recorded earlier. If this log entry indicates that the request was approved by the server, or does not indicate whether the request was approved, the system implements an additional security check, based on the information contained in this entry (and, optionally, the relevant metadata). Further to this security check, the system may decide to deny the request, e.g., by closing the connection between the client and the server or by modifying the response to indicate that the request was denied. Alternatively, the system may approve the request with certain added restrictions, e.g., by limiting the length of time for which the client is entitled to access a requested resource. As yet another option, the system may implement additional security measures, e.g., by requesting additional authentication from the user, before approving the request. Alternatively, the system may simply approve the request without any further action. Following the approval of the request, the system may communicate the response directly to the client, or return the response to the server for forwarding to the client.

The system described herein may also assist other network security systems, such as network firewalls, application firewalls, intrusion detection and prevention systems, and anomaly detection systems. In particular, the system may pass any relevant information gleaned from the logs to these other network security systems, such that these other systems may implement any relevant security measures in real-time. Moreover, the techniques described herein may be helpful even in cases in which the relevant communication is not encrypted, in that the log file may include useful information (e.g., an association between the user and a particular token) that is not included in the request or response, or that is difficult to decode from the request or response.

It is emphasized that the techniques described herein are fundamentally different from other techniques in which log entries pertaining to a session are examined only after the session has taken place. In particular, as described above, the system performs its analysis at a point in time at which the messages that have already been exchanged have caused at least one log entry to be generated, but have not allowed the objective of the session to be achieved. Thus, the system is able to stop an attempted attack, or other unauthorized access, before any damage is done.

System Description

Reference is initially made to FIG. 1, which is a schematic illustration of a system 20 for managing requests and the responses to such requests, in accordance with some embodiments of the present invention.

In the example scenario depicted in FIG. 1, a client 22 and a server 24 belong to a local area network (LAN) 28, such as a LAN belonging to a workplace. Client 22 and server 24 may be associated with one another in a Windows domain, or in any other suitable association. In the case of a Windows domain, server 24 may comprise a DC that manages the domain by running ADDS, and all user accounts that are used with client 22 may be registered with the DC.

Client 22 may send, to server 24, various types of requests, such as a request to authenticate or a request to access a resource. For example, the client may request to access a service that is hosted on server 24 or on any other device on network 28, or a remote server. Similarly, server 24 may send, to other servers in the network, various types of requests, such as a request to verify that the user of client 22 is authorized to access a resource. (Such a request may be sent responsively to a request from the client to access the resource.)

Client 22 comprises a network interface, such as a NIC 40, and a processor 42. Processor 42 exchanges communication with server 24, and with other devices within and outside network 28, via NIC 40. Likewise, server 24 comprises a network interface, such as a NIC 36, and a processor 38. Processor 38 exchanges communication with client 22, and with other devices, via NIC 36.

System 20 further comprises a log-assisted security manager (LASM) 26, which is configured to communicate with server 24. LASM 26 comprises a processor 34, configured to perform the various functions described herein, along with a network interface, such as a NIC 32, via which the LASM exchanges communication with other devices.

In some embodiments, LASM 26 comprises a dedicated server, while in other embodiments, the LASM belongs to a network appliance (e.g., a switch or router), a network security system (e.g., a firewall, such as a network firewall, application firewall, or a firewall that protects a web server, an intrusion detection and prevention system, or an anomaly detection system), a network auditing system, an Identity and Access Management system, an authentication/authorization policy enforcement system, or any other device or system. In some embodiments, as shown in FIG. 1, LASM 26 does not belong to LAN 28, and server 24 communicates with LASM 26 over an external network 30, such as the Internet. (In such embodiments, the server may communicate with the LASM over a VPN tunnel.) In other embodiments, LASM 26 resides within LAN 28. In yet other embodiments, the LASM is not associated with a network at all.

As described in detail below with reference to FIG. 2, server 24 is configured to forward, to LASM 26, any relevant request received from client 22, instead of immediately processing the request. (Typically, server 24 does not retain a copy of the forwarded request.) Further to receiving the request, the LASM may record relevant data associated with the request, prior to returning the request to server 24 for processing. Following the processing of the request, server 24 communicates, to LASM 26, the server's response to the request, instead of communicating the response directly to the client. (Typically, server 24 does not retain a copy of the forwarded response.) Server 24 may also communicate one or more log entries to LASM 26. Subsequently, the LASM, while holding the response, inspects at least one log entry that pertains to the request.

Based on the information contained in the log entry, the LASM may perform a relevant security function, as described in detail below with reference to FIG. 2. (Advantageously, this function may be performed even without first decrypting the request or the response.) Subsequently, the LASM may, if appropriate, return the response to the server for forwarding to the client.

Typically, the server forwards the relevant requests and responses to the LASM using one or more modules, comprising any suitable combination of hardware and/or software components, that are separate from the applications that process the relevant requests. Typically, at least some of these modules operate at the network layer of the server, i.e., at the lower-level subsystem of the server that handles and processes network traffic. These modules may include any software that runs in the operating system kernel or in the user space, including, for example, software responsible for blocking or modifying received network packets. (This software may be described as "network-layer software," and may additionally be said to "run at the network layer." In some embodiments, this software includes hypervisor software.) Alternatively or additionally, the network layer may include any physical or virtual network devices. Other examples of network-layer components include network address translator (NAT) software, routing software, Virtual Private Network (VPN) software, port-forwarding software, software firewalls, network interface controllers (such as NIC 36), drivers, and filter drivers.

For example, the server may be configured to forward relevant communication to the LASM by virtue of a driver, installed on the server, that handles incoming communication to the server in accordance with rules that specify which communication is to be forwarded to the LASM, which is to be sent to a higher-level application, and which to another device. Alternatively, a NAT installed on the server may perform this function. Alternatively or additionally, port forwarding, routing, and/or any other technique described in International Application Publication WO/2018/096471, whose disclosure is incorporated herein by reference, may be used to implement the forwarding techniques described herein.

In some embodiments, the aforementioned modules also communicate the relevant log entries to the LASM. The log entries may be communicated in response to the logging of a request, in response to any update to the log file (whether or not this update pertains to a request), periodically, and/or in response to receiving a request from the LASM to communicate the log entries.

In other embodiments, the client, alternatively or additionally to the server, forwards communication to LASM 26. Thus, for example, the network layer of the client may communicate a request to the LASM before communicating the request to the server. Similarly, upon receiving a response to the request, the network layer of the client may forward the response to the LASM, rather than passing the response to the client application that generated the request. The network layer of the client may perform these functions using any of the techniques described above.

In yet other embodiments, LASM 26 is situated inline, i.e., the LASM resides between client 22 and server 24, such that all communication between the client and the server passes through LASM 26. In such embodiments, the LASM may receive a request directly from the client, and, after receiving the response to the request from the server, communicate the response directly to the client. Communication that does not relate to a relevant type of request may be forwarded transparently to the intended destination.

For example, the physical connection between the client and the server may pass through the LASM, such that the LASM "sits on the wire" between the client and the server. Alternatively, in a virtual network, the LASM may include a virtual machine having two virtual adapters: one for communication with the client, and the other for communication with the server. Alternatively, the client and/or server may be configured to use the LASM as a proxy server. As yet another alternative, during the discovery process in which one of the parties requests the address of the other party, the Internet Protocol (IP) address of the LASM may be returned. For example, a Domain Name System (DNS) for the network may be configured to return the IP address of the LASM whenever the address of the client or server is requested. To help prevent direct communication between the client and the server, users may be refused permission to change the relevant configurations, such of those of the client, server, or DNS. Alternatively or additionally, firewall rules may be defined to block any direct communication between the two parties. (Such rules may be defined using a firewall that is native to either one of the parties, or using a network firewall.)

In yet other embodiments, a module comprising any suitable combination of hardware and/or software elements, which perform the functionality of the LASM as described herein, may be installed on the client and/or the server, thus obviating the need for communication with a separate server. For example, a log-inspecting application that performs the functionality of the LASM may be installed on the server. Upon receiving a relevant request from the client, the network layer of the server may pass the request (internally) to the log-inspecting application. Similarly, after receiving a response to the request from the relevant request-processing application, the network layer may pass the response to the log-inspecting application. The log-inspecting application may then read the relevant log file that is stored on server 24, and perform any relevant function responsively thereto.

It is noted that LAN 28 may include any number of clients and servers, each of which may be configured to perform the relevant functionality described herein. In some embodiments, system 20 comprises a plurality of log-inspecting servers, each of which is analogous to the LASM, and each of which may service any number of LANs and/or other types of local networks, by receiving and processing communication that is forwarded from these networks. In some embodiments, even devices that do not belong to a local network may forward relevant requests, and/or the responses to such requests, to LASM 26.

Requests forwarded to LASM 26 may include, for example, a request to access a service, such as a directory service (e.g., a Lightweight Directory Access Protocol (LDAP) directory service), an NT LAN Manager (NTLM) or Netlogon authentication handler, a webserver, a file system, a mainframe system, an industrial control system, a domain, a ticket or encryption key, an application, an application server, a data storage device, a computer, or any other communication device or network resource. Other relevant requests include authentication requests, such as Kerberos authentication requests, identity federation requests such as OpenID Connect requests, OAuth requests, and Security Assertion Markup Language (SAML) requests.

In general, the techniques described herein may be applied to any scenario in which a first device, which may be referred to as a "request-origin device," communicates a request to a second device, which may be referred to as a "request-destination device." The application on the request-origin device that generates the request may be referred to as a "request-origin application," while the application on the request-destination device that processes the request may be referred to as a "request-destination application." The request-origin application may include, for example, a Windows authentication package, a web client application, a web browser, a Java app, a remote desktop client, or a file explorer. The request-destination application may include, for example, a directory service (such as ADDS), a Lightweight Directory Access Protocol (LDAP) server application, a web server application, or a file server application. For simplicity, however, the present description generally refers to the particular example illustrated in FIG. 1, in which client 22 is the request-origin device and server 24 is the request-destination device.

In general, each of the processors described herein may be embodied as a single processor, or as a cooperatively networked or clustered set of processors. The functionality of each of the processors described herein may be implemented solely in hardware, e.g., using one or more Application-Specific Integrated Circuits (ASICs) or Field-Programmable Gate Arrays (FPGAs), or at least partly in software. For example, any one of the processors described herein may comprise a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

Log-Assisted Security

Figure 2:
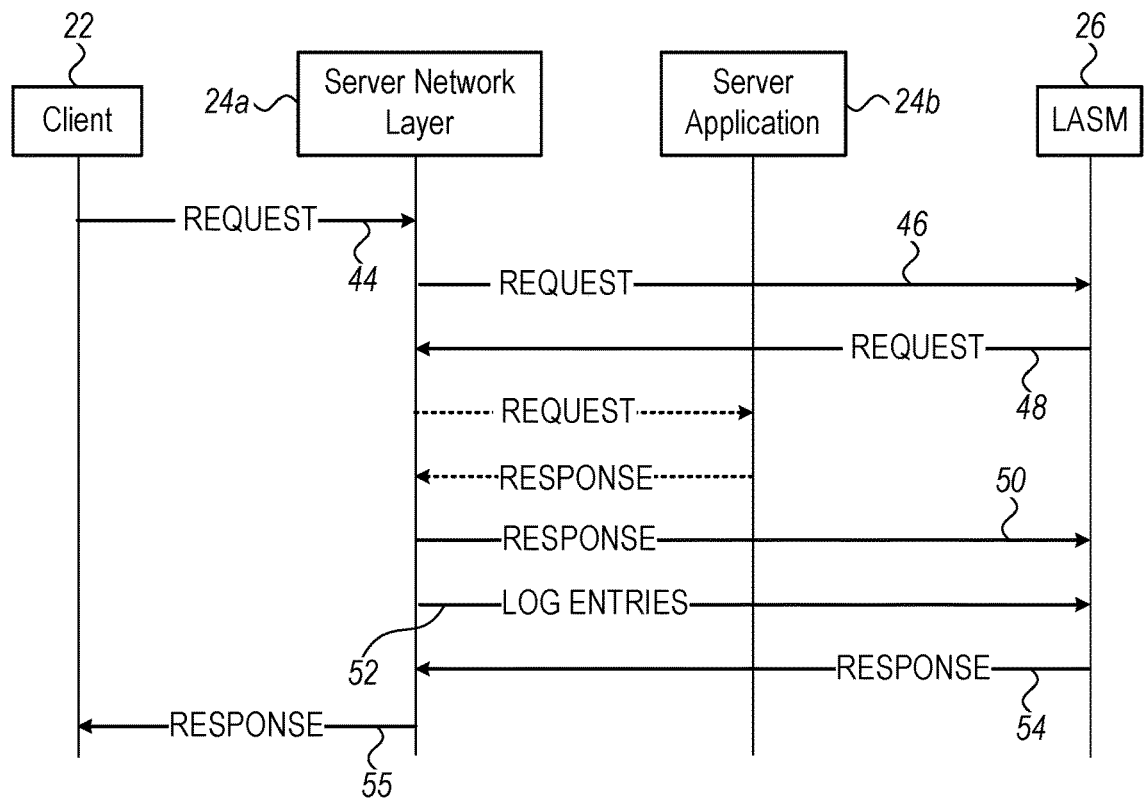
FIG. 2 is a schematic illustration of a flow of communication between a client, a server, and a log-assisted security manager, in accordance with some embodiments of the present invention.

Reference is now made to FIG. 2, which is a schematic illustration of a flow of communication between client 22, server 24, and LASM 26, in accordance with some embodiments of the present invention.

By way of introduction, it is noted that FIG. 2 depicts two separate layers of functionality of server 24 participating in the illustrated flow of communication. The first of these layers, a network layer 24a, handles communication to and from server 24. As described above with reference to FIG. 1, components of server 24 at the network layer may include one or more hardware elements, such as NIC 36, along with any relevant software installed on server 24, which, when executed by processor 38, performs the forwarding functionality described herein. In some embodiments, network layer 24a is implemented at least partly on a virtual machine.

The second of these layers, an application 24b that runs in the user space or kernel of the server, processes requests from client 22. Application 24b may include, for example, an Active Directory Domain Services (ADDS) application, an LDAP application, an NTLM or Netlogon authentication handler, or a webserver. In some embodiments, application 24b runs on a virtual machine. Advantageously, communication between the server and LASM 26, as described herein, may be performed even without any special configuration of application 24b.

The flow of FIG. 2 begins with a first message 44, which is communicated by the client to the server. First message 44 includes a request originating from an application running on client 22 and directed to application 24b. (In the context of the present application, including the claims, a message is said to be "directed to" a particular device or application if the particular device or application is the intended recipient of the message.) The request may use any suitable protocol, such as the Netlogon protocol or Kerberos protocol, and is typically at least partly encrypted. As an example, the client may request an access key from the server, including, in the request, the encrypted username and password of the user requesting the key, and an unencrypted session identifier for the session between the client and the server.

First message 44 is received at network layer 24a. Subsequently, processor 38, by executing relevant network-layer software, forwards the request (via NIC 36), in a second message 46, to LASM 26, without communicating the request to application 24b and, typically, without retaining a copy of the request. (The forwarding of the request may alternatively be described as being performed by the network layer itself, or by the relevant components that belong to the network layer.) Typically, second message 46 (along with all other communication between the server and the LASM) is authenticated and/or encrypted with an additional layer of encryption, i.e., a layer of encryption on top of the preexisting encryption of the request.

Typically, network layer 24a is configured to differentiate between different types of messages, such that only relevant traffic is forwarded to LASM 26. For example, in some cases, certain ports on server 24 may be designated for requests of certain types. In such cases, the network layer may forward any traffic received at these ports to the LASM, without forwarding traffic received at other ports to the LASM. Alternatively or additionally, a driver may be configured to inspect any unencrypted content, and/or unencrypted metadata, of the incoming communication, and to decide, based on this inspection, whether to forward the communication to LASM 26.

Subsequently to receiving second message 46, LASM 26 inspects the (unencrypted) metadata contained in the message. Such metadata may include data from any layer of the message, including, for example, network routing information, such as media access control (MAC) or Internet Protocol (IP) addresses, session identifiers, timestamps, or application-specific data. Based on the metadata, the LASM may ascertain that the message includes a relevant type of request, such a request to authenticate and/or to access a resource.

Subsequently, the LASM typically records relevant metadata that are associated with the request by virtue of being included in second message 46. Such metadata may include any of the types of information delineated above. Thus, for example, the LASM may record a session identifier, a time of the request, and/or the network address of the client from which the request was sent. Alternatively or additionally, the LASM may modify the request to include a particular marker, and further record this marker. For example, the LASM may insert a new field in the metadata of the request, or modify an existing field, such as the timestamp or an optional field. Subsequently, the LASM returns the request to the server (and in particular, to network layer 24a), by communicating, to the server, a third message 48 that includes the request. Typically, third message 48 is communicated over a separate connection from the connection over which the second message was communicated.

In response to identifying that the third message was received from the LASM, rather than from the client, network layer 24a passes the request to application 24b. (The dashed arrows between network layer 24a and application 24b indicate communication that is passed internally, within server 24.)

In some embodiments, the LASM returns the request to the server under an identifier of the client, such that the returned request appears, to application 24b, to have been received from the client. For example, the LASM may insert the Internet Protocol (IP) address of the client in the "source IP" field of third message 48. Alternatively or additionally, network layer 24a may format the request to appear to application 24b as if the request were received directly from the client. Advantageously, this may help obviate the need to make any changes to application 24b to facilitate the flow of communication depicted in FIG. 2.

Subsequently to receiving the request, application 24b may verify the request, e.g., by checking the username and password contained in the request. Subsequently, the application generates a response to the request, this response being directed to the client (and in particular, to the application on the client that generated the request) and typically being at least partly encrypted. As an example, in the event that an access key was requested and the request was granted, the response may include the encrypted access key along with the unencrypted session identifier for the session between the client and the server. As another example, the response may include an encrypted ticket or an encrypted cookie, along with the unencrypted session identifier.

Application 24b further records relevant information associated with the request and/or response, such as an identifier of the user who submitted the request, respective identifiers of the client and server, the time of the request, the name of the application, whether the request was approved, and/or the name of the resource the client is intending to access. This information is recorded in a log file, such as a Windows Event Log file for a Netlogon request, a syslog file for an access request submitted over a Linux network, a cloud logging service such as CloudTrail, a dedicated logging service such as Logstash, or a log file that is specific to application 24b. The log file may be stored in any suitable format, such as the xml or evt format.

Subsequently, application 24b communicates the response to network layer 24a. Subsequently to receiving the response from the application, and without communicating the response to the client (and, typically, without retaining a copy of the response), the network layer forwards the response, in a fourth message 50, to the LASM, using any of the forwarding techniques described above. Typically, the response from application 24b is associated with the separate connection over which third message 48 was passed, such that the network layer of the server may ascertain that the response is to be forwarded to the LASM, rather than communicated directly to the client.

Subsequently, the LASM receives the response, by receiving fourth message 50. By virtue of the fourth message being associated with the separate connection over which the third message was passed, the LASM knows to match the response with the preceding request, i.e., to associate the response with the preceding request. The LASM further receives from the server (e.g., over an encrypted channel) one or more log entries, in a fifth message 52. For example, subsequently to receiving fourth message 50, the LASM may request the log entries from the server, and the server may, in response to this request, send the log entries to the LASM. Alternatively, as described above with reference to FIG. 1, the server may send the log entries to the LASM even without the LASM requesting the log entries. For example, the server may send the log entries following every update to the log file, periodically, and/or immediately following the communication of a response to the LASM. In any case, if fourth message 50 is received before the log entries, the LASM holds the fourth message until the log entries are received, and then, while continuing to hold the response, processes the log entries as described below.

In some embodiments, the LASM obtains the log entries by receiving the original log file as recorded by the server, or at least the newest portion of this log file that was not yet communicated to the LASM. In other embodiments, the server first copies the log entries from the log file into another file (or directly into a data packet), and then communicates the other file (or data packet) to the LASM. In such embodiments, in performing the copying, the server may reformat the log entries. (In view of the above, it is noted that in the context of the present application, including the claims, the term "log entry" includes, within its scope, any data obtained from a log entry, even if these data are not in the original format in which the log entry was recorded.) In yet other embodiments, the LASM obtains the log entries by remotely accessing the log file. Alternatively, the server may first copy the log entries into another location in the memory of the server, and the LASM may then remotely access this location.

In other embodiments, the LASM receives the log entries from another party, such as another network system (e.g., a Network Gateway or firewall) that receives the log entries from the server, or from a network auditing system that logs all activity on the network. An advantage of such embodiments is that the server need not be specially configured to communicate the log entries to the LASM. (Alternatively or additionally to the log entries, the LASM may receive other network-security information, such as security alerts, from the other network security system, which the LASM may use to perform the functions described below.) Alternatively or additionally, in the event that the client logs the client's requests, the LASM may obtain, from the client, one or more relevant log entries that were recorded by the client subsequently to communicating the request. These log entries may be obtained from the client using any of the techniques described above with respect to the server.

In many cases, the LASM receives multiple log entries entered by application 24b, some of which do not pertain to the request. Hence, the LASM may need to identify, from among the multiple log entries, the at least one log entry that pertains to the request, i.e., the at least one log entry that was recorded by application 24b responsively to the request. For example, the LASM may identify the log entry by identifying, in the log entry, metadata (e.g., a session identifier, IP address, port number, client ID, and/or user ID) associated with the request, which the LASM recorded earlier. Alternatively or additionally, if the LASM modified the request to include a particular marker, the LASM may identify the log entry by identifying the particular marker in the log entry. Alternatively or additionally, the LASM may identify the log entry by identifying, in the log entry, an identifier of the communication interface, such as a network adapter or port, via which the request was communicated from the LASM to the server.

Alternatively or additionally, the LASM may identify the log entry by identifying a correspondence between the time of the log entry and the time at which the request was communicated from the LASM to the server. To facilitate identifying the log entry using this technique, the LASM may enforce a minimum time interval between successive requests communicated from the LASM to the server. For example, the LASM may refrain from communicating a given request to the server until at least one millisecond has passed from the communication of the previous request.

In some cases, it may be difficult to identify the relevant log entry, even using one or more of the techniques described above. In such cases, if the LASM, after communicating a first request to the server, receives a second request that is directed to the server, the LASM may refrain from communicating the second request to the server until the LASM has ascertained that the log entries were entered, e.g., by virtue of receiving the log entries, or by virtue of monitoring the log service as further described below. (The LASM may further wait until the response to the first request is received.) In this manner, the LASM may more readily identify the log entry that pertains to the first request. (Notwithstanding the above, in some embodiments, the LASM may communicate the second request to the server after the response to the first request was received, even if the LASM did not yet verify that the log entries were entered.)

Following the identification of the log entry that pertains to the request, the LASM, while holding the response, identifies relevant information contained in the log entry. For example, the LASM may identify the identity (e.g., the name and/or user ID) of the user who submitted the request, the name of the application that recorded the log entry (and to which the request was directed), and/or whether the request was approved. For an access request or authorization request, the LASM may further identify the resource to which access was requested.

(It is noted that a request to access a resource is said to be "approved" if access to the resource was granted. Similarly, an authentication request is said to be approved if the submitted authentication factor was verified, while an authorization request is said to be approved if the authorization was verified.)

Subsequently, the LASM performs a function in response to the information identified from the log entry (and, in some cases, also in response to any unencrypted content of the response). Example functions include, in the event that the request was approved, (i) preventing the response from being communicated to the client, (ii) sending the client a message stating that the request was denied, (iii) closing the connection between the client and the server, (iv) while holding the response, requesting authentication from the user who submitted the request, or requesting approval of the request from an individual other than the user, (v) altering the response before returning the response, or (vi) simply returning the response as is. Further details regarding these and other examples are provided below.

In some cases, at least some of these functions are performed in accordance with predefined security rules, which specify, for example, the resources that each user is allowed to access, and any restrictions on such access. For example, the rules may specify the maximum amount of time for which access to a particular resource may be granted to each user. Alternatively or additionally, the rules may specify, for certain users, additional authentication that is required before an access request, an authentication request, or an authorization request may be granted. The security rules may be defined by a network administrator, by the respective managers of the users, or by any other entity. In some embodiments, a security rule may be adaptive, in that the rule depends on properties of the request and/or the history of prior requests. For example, the rule may specify that additional authentication is required if an anomaly in the request is detected. (For example, additional authentication may be required if the request was sent at an unusual time). In such embodiments, the LASM is configured to analyze the request, such as to detect any such anomalies.

For example, for an access request, the LASM may ascertain (from the log entry, from the unencrypted content of the response, and/or by analyzing the encrypted bytes in the response) that the response indicates that the request was approved (e.g., by virtue of containing an access key, ticket, or cookie that is needed to access the resource). The LASM may further ascertain, from the log entry, the identity of the user who submitted the request, and the requested resource. If the security rules specify that the user is entitled to access the requested resource without any restrictions, the LASM may cause the response to be communicated to the client, by returning the response to the server for forwarding to the client or communicating the response directly to the client.

On the other hand, if the security rules specify that the user is not entitled to access the requested resource, the LASM may prevent the response from being communicated to the client (e.g., by continuing to hold the response), such that the client, and hence the user, does not access the resource. The LASM may further cause the communication session between the client and the server (i.e., the communication session to which the request and response belong) to terminate. For example, the LASM may actively close the connection between the client and the server, e.g., by sending the client and/or server a message indicating that the connection is closed. Alternatively, the LASM may send the client (e.g., via the server) a message that indicates that the request was denied, such that the client closes the connection. Alternatively, the LASM may alter the response to indicate that the request was denied, or deliberately corrupt the response (e.g., by adding bytes, deleting bytes, or changing bytes), such that the client cannot validate the response. Alternatively, the LASM may simply hold the response until the connection between the client and the server times out.

As another example, the security rules may specify that the user is required to confirm the request, and/or submit (or at least prove the possession of) additional authentication. In such a case, the LASM, while holding the response, may request that the user confirm the request, and/or submit (or at least prove the possession of) the required authentication. To perform this function, the LASM may, for example, communicate an appropriate message to the client, or to another device, such as the user's smartphone, requesting that the user confirm possession of the device, and/or submit a password, biometric factor (such as a fingerprint), or any other appropriate authentication factor. (The LASM may perform this request, and receive the user's response thereto, via a third-party multi-factor authentication system.) Subsequently, the LASM waits to receive the requested confirmation and/or authentication factor. If the confirmation and/or authentication factor are not received and verified within a predefined time interval, the LASM may continue holding the response, and/or perform any of the other functions described above. Otherwise, the LASM may release the response to the client.

As another example, if the security rules specify one or more checks that must be performed before the request is approved, the LASM, while holding the response, may perform the required checks. For example, the LASM may verify the client's location, the user's behavioral traits, and/or that the client possesses a particular certificate.

As another example, for an access request, if the response indicates that the request was approved but the security rules specify that the user is required to get permission from another individual, such as the user's manager, to access the requested resource, the LASM may, while holding the response, request approval of the request from this other individual. For example, the LASM (e.g., via a third-party system) may communicate an appropriate message to the individual, requesting approval of the user's request. If the approval is not received within a predefined time interval, the LASM may prevent access to the resource, as described above.

As yet another example, for an access request, if the client was granted access but the security rules specify particular restrictions to the access, the LASM may modify the response such as to enforce these restrictions, prior to returning the response to the client. For example, the LASM may modify the response to grant a lower level of access than that which was granted by the server. Thus, for example, instead of having access to the entire network, the client may be granted access only to a limited number of resources on the network. Alternatively or additionally, if the security rules specify that access may be granted only for a predetermined amount of time, the LASM may accordingly alter the response to reduce the validity time of the ticket (or other authentication-granting token) that is carried by the response. (It is noted that, typically, the LASM may modify the response only if the response is not signed.)

Alternatively or additionally, the LASM may enforce a restriction subsequently to causing the response to be communicated to the client. For example, the response may allow the client to access a particular resource, but the security rules may specify that this access may be granted only for a predetermined amount of time. In such a case, the LASM may terminate access of the client to the resource after the predetermined amount of time. For example, in the event that the requested resource is hosted on server 24, the LASM may receive, from the server, all of the traffic belonging to the communication session in which client 22 accesses the resource. The LASM may therefore terminate this communication session after the predetermined amount of time, e.g., by actively closing the connection between the client and the server, or by simply holding the traffic until the connection times out. A similar technique may be used if the LASM resides physically or logically between the client and the resource.

Typically, if the LASM ascertains that the request was denied, the LASM simply returns the response as is. In the event that the LASM ascertains that the request was denied before the log entries are received, the LASM may return the response even before processing the log entries.

In some cases, in response to the information from the log entry, the LASM may generate an alert. For example, if the user who submitted the request is unknown, or is known to present a particular risk to network 28, the LASM may communicate an alert to a network administrator or to a reporting system. Such an alert may be generated regardless of whether the request was approved, and regardless of whether the response is returned to the client.

In some embodiments, the LASM may communicate (e.g., via a third-party system) an explanatory message to the user (e.g., to the user's smartphone or personal computer), in the event that the LASM denied the request. For example, if the LASM does not receive proper authentication from the user, the LASM, after terminating the session between the client and the server, may communicate a message to the user explaining that the session was terminated due to lack of receipt of proper authentication.

In some embodiments, in response to the information from the log entry, the LASM calculates a risk score, e.g., based on factors such as the identity of the user, the time of the request, and the sensitivity of the requested resource. In response to the risk score exceeding a predetermined threshold, the LASM may perform any of the security functions described above.

In some embodiments, the LASM, e.g., using online learning techniques, continually updates the relevant security rules, based on new training data that have been obtained. In such embodiments, the LASM may add parameters of the request and the response, along with information from the log entry, to the training data, and then learn updated security rules from the training data. Alternatively or additionally, the LASM may log these data for future reference, e.g., by a network-security analyst.

In some embodiments, the LASM receives information from other network-security systems, and uses this information, along with the information contained in the log, to decide on the performance of a security-related function. For example, the LASM may receive indications from other security systems about suspicious or high-risk entities (e.g., users, clients, servers, or IP addresses), and consider this additional data when processing the response. As a specific example, the LASM may receive an alert from a firewall or an endpoint protection product indicating that a specific device is infected with malware. In response to this alert, the LASM may apply a stricter standard for requests originating from the infected device, such that, for example, all requests originating from this device require additional authentication.

In some cases, all of the log entries received by the LASM may dictate the same security function, such that the LASM does not need to identify the log entry corresponding to the given request. For example, the security rules may specify one type of security function (e.g., extra authentication) for one class of users (e.g., administrators), and another type of security function (or no security function at all) for another class of users (e.g., non-administrators), without differentiating between different users of the same class. In such a case, provided that all of the received log entries specify one class of users, the LASM may simply perform the appropriate function for the specified class of users.

In some cases, it may take a relatively long amount of time to receive the log entries. Furthermore, even if the log entries are received relatively quickly, it may take a relatively long amount of time to process the log entries, and/or to perform any subsequent network-security functions that require continued holding of the response. Hence, the timeout period may be increased for client 22 and/or server 24, such that the connection between the client and server is not closed while the response is held by the LASM. Alternatively or additionally, before reaching the timeout period, the LASM may release the response to the client even if the appropriate network-security functions have not yet been performed, such as to prevent the connection from timing out. Subsequently, while the client begins to access resources on the network by virtue of the access request, authorization request, or authentication request having been approved, the LASM may perform the appropriate network-security functions, and then terminate the client's access if necessary. (In some cases, as described above, this function may be facilitated by virtue of the LASM receiving the traffic exchanged with the client as the client accesses the resources.)

For example, while the LASM waits to receive authentication from the user of the client, the LASM may return the response to the client, such that the client may begin accessing the relevant resources on the network. Subsequently, however, if the authentication is not received and verified within a predefined interval of time, the LASM may require that the client reauthenticate before continuing to access the resources, or may simply terminate the client's access.

Alternatively, to avoid a timeout, the LASM may allow the request, but implement the required security measures (such as requiring additional authentication) on subsequent, similar requests from the client.

In some embodiments, the relevant log service, such as Windows Event Log, is monitored, e.g., by a software module that is installed on the server and is in communication with the LASM. Alternatively, the log service itself may communicate with the LASM. In either case, the LASM may be regularly updated as to the status of the log service. In the event that the log service is overloaded or is otherwise lagging, the LASM may reduce the rate at which traffic is released, such as to give the log service time to bring the log files up-to-date. Alternatively or additionally, the LASM may refrain from holding any traffic, or indefinitely hold all traffic, until the log files are up-to-date. As yet another alternative, the server may cease forwarding traffic to the LASM until the log files are up-to-date.

Subsequently to processing the response and the log entries, if the LASM does not decide to withhold the response, the LASM returns the response to the server in a sixth message 54 that belongs to the same connection as second message 46, third message 48, and fourth message 50. (As noted above, the LASM may modify the response before returning the response to the server.) The response is received at the network layer of the server. Subsequently, the server forwards the response, in a seventh message 55, to the client, and in particular, to the application on the client that generated the request.

As described above with reference to FIG. 1, in some embodiments, LASM 26 is installed on server 24. In such embodiments, the flow of communication generally proceeds as described above with reference to FIG. 2, except for a few differences. One such difference is that second message 46, third message 48, fourth message 50, and sixth message 54 are communicated internally within the server. Another difference is that there may be no need for fifth message 52, given that the LASM may access the log file directly.

As further described above with reference to FIG. 1, in some embodiments, the LASM is physically or functionally situated between the client and the server, such that all communication between the client and the server passes through the LASM. In such embodiments, the flow of communication is generally as described above with reference to FIG. 2, except for a few differences. One such difference is that first message 44 is received by the LASM directly from the client (such that second message 46 is not required), and sixth message 54 is received by the client directly from the LASM (such that seventh message 55 is not required).

In such "inline" embodiments, upon receiving any given message, the LASM inspects the unencrypted metadata contained in the message, and decides, based on the metadata, whether the message includes a relevant request or a response thereto. If yes, the message is processed as described above; otherwise, the message is immediately passed to the intended destination. Thus, for example, subsequently to receiving first message 44 from the client, the LASM may ascertain that first message 44 contains specific metadata indicating that first message 44 includes a relevant request; for example, first message 44 may specify a particular port of the server that is known to handle access requests, authentication requests, or authorization requests. In response thereto, the LASM may process first message 44, as described above.

Execution Details

Figure 3:
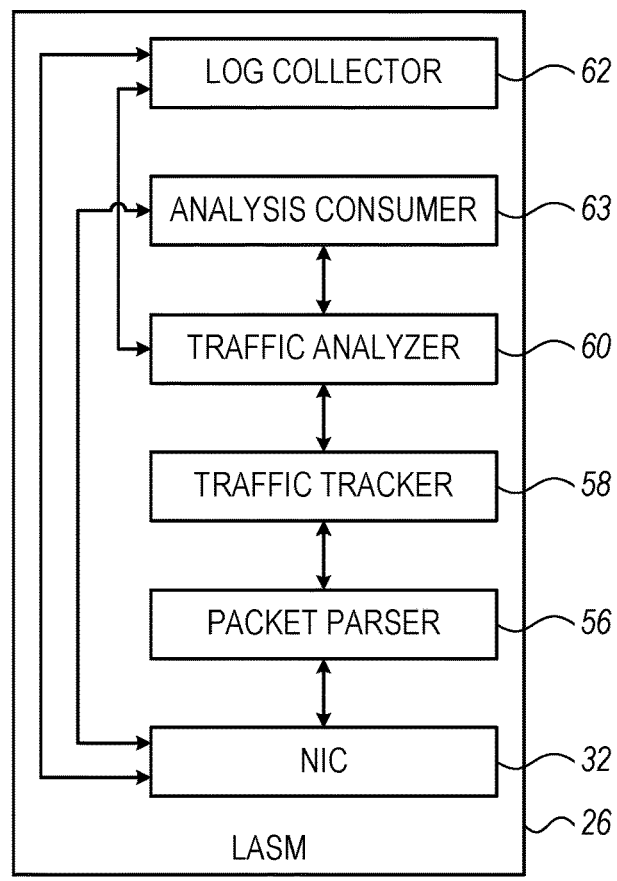
FIG. 3 is a schematic diagram showing various execution modules belonging to a log-assisted security manager, in accordance with some embodiments of the present invention.

Reference is now made to FIG. 3, which is a schematic diagram showing various execution modules belonging to LASM 26, in accordance with some embodiments of the present invention.

Typically, LASM 26 comprises NIC 32, described above with reference to FIG. 1, along with various modules that are executed by processor 34 (FIG. 1) of the LASM to perform the various techniques described herein. In some embodiments, these modules include a packet parser 56, a traffic tracker 58, a traffic analyzer 60, a log collector 62, and an analysis consumer 63. Each module may be implemented in hardware and/or software (which may run on a physical or virtual machine), as described above with reference to FIG. 1. Some of the specific functionality of each of these modules is described below with reference to FIG. 4.

FIG. 3 indicates, by double-sided arrows, one possible scheme for communication between the various elements of LASM 26. It is emphasized, however, that the configuration of the LASM shown in FIG. 3 is provided by way of example only. In general, LASM 26 may comprise any suitable number of hardware and/or software modules, with each of these modules being configured to communicate with any one or more other modules.

Figure 4:
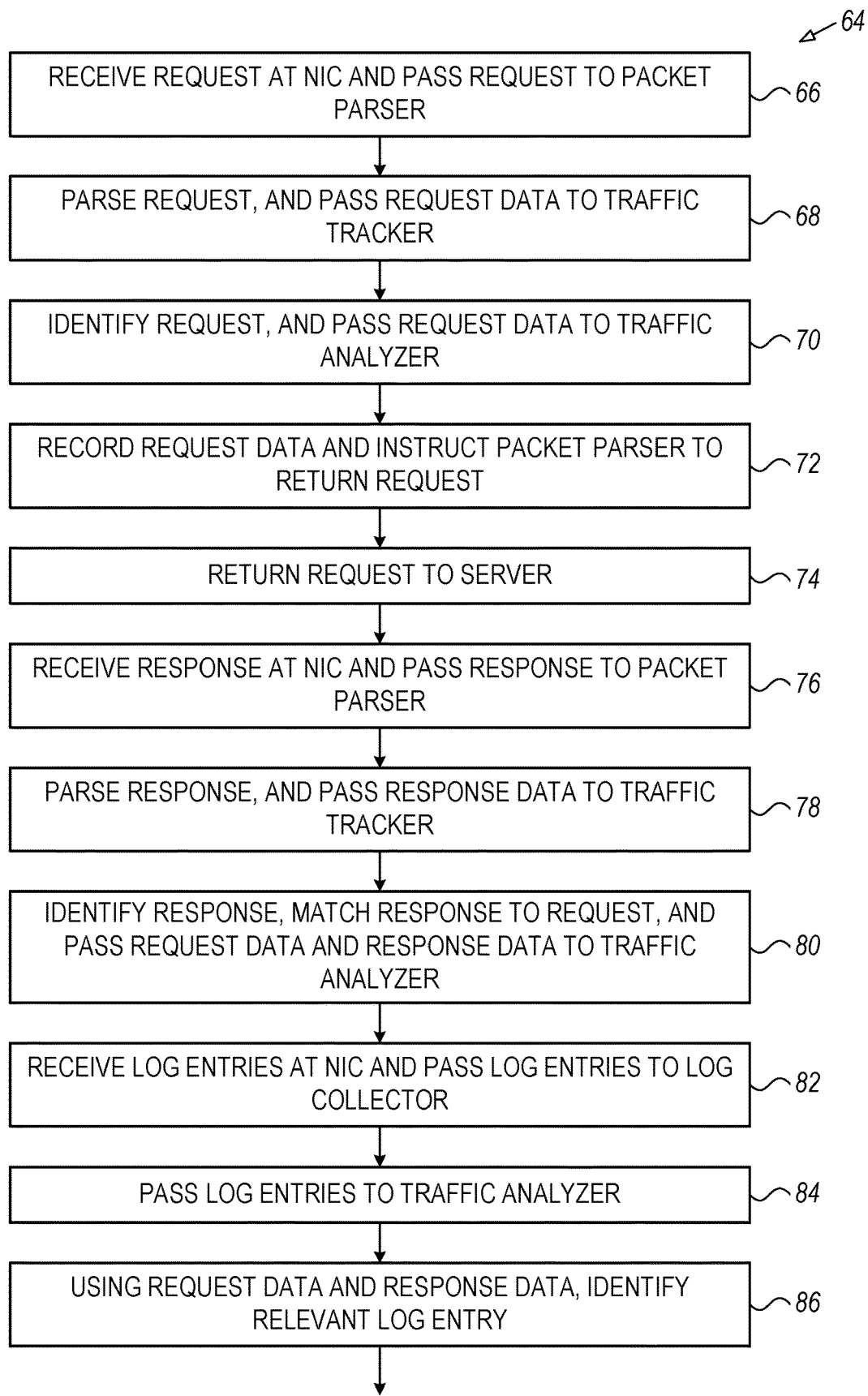
FIG. 4 is a flow diagram for a method for protecting resources on a computer network, in accordance with some embodiments of the present invention.
Figure 4:
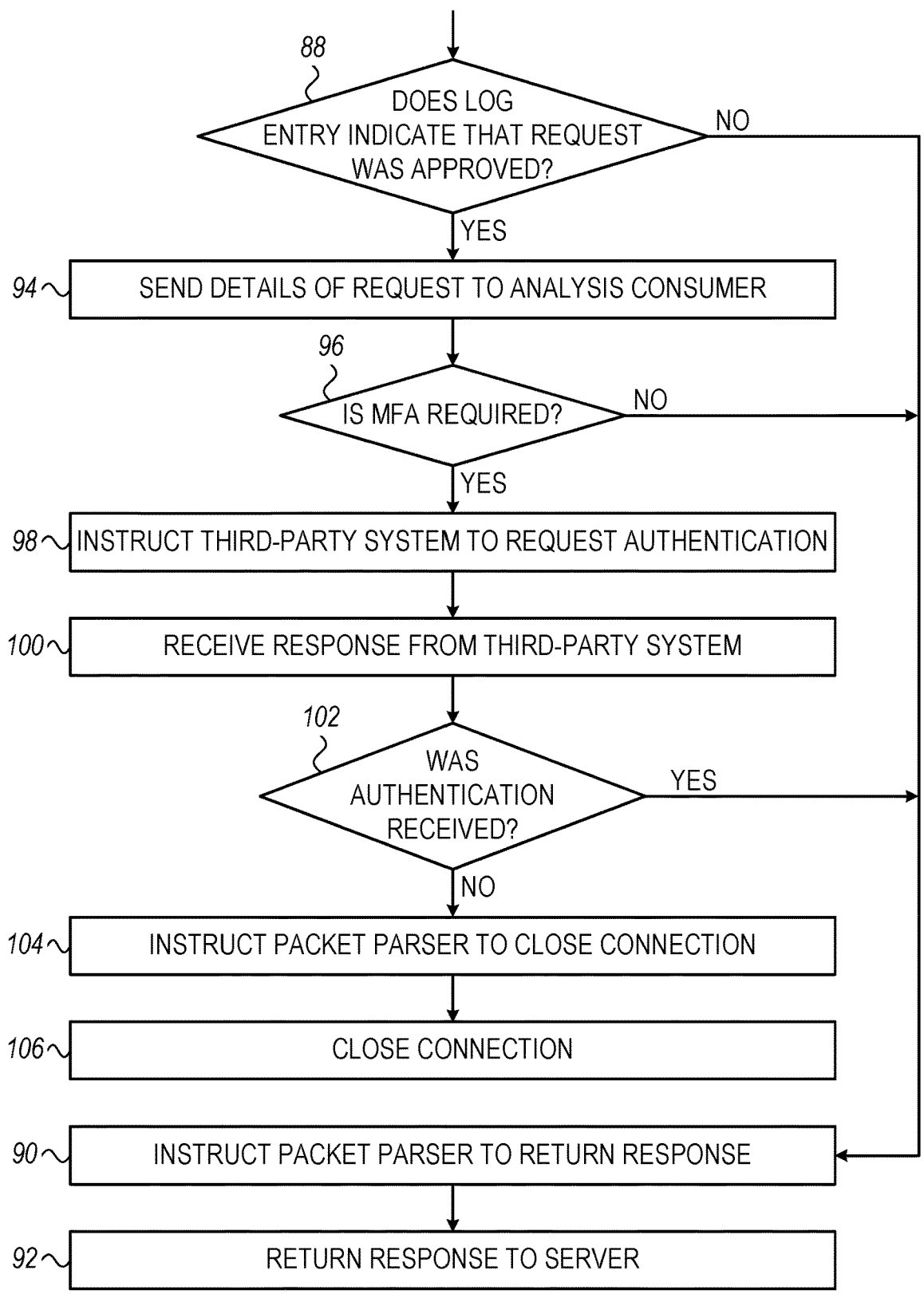

Reference is now made to FIG. 4, which is a flow diagram for a method 64 for protecting resources on network 28, in accordance with some embodiments of the present invention. FIG. 4 provides more detail regarding some of the functionality described above with reference to FIG. 2, with additional reference being made to the configuration of LASM 26 shown in FIG. 3.

As shown in FIG. 4, method 64 begins with a request-receiving step 66, at which NIC 32 receives, from the server, one or more packets (corresponding to second message 46 of FIG. 2) that include a request (e.g., a request to access a resource), and passes these packets to packet parser 56. Subsequently, at a request-parsing step 68, the packet parser parses the packets, such as to identify various data (e.g., source, destination, and session identifiers) specified in the packets, and passes these data to traffic tracker 58. Next, at a request-identifying step 70, the traffic tracker identifies (e.g., from the request data) that the packets include a relevant type of request. In response thereto, the traffic tracker passes the request data to traffic analyzer 60.

Subsequently, the traffic analyzer ascertains from the request data that the request belongs to a new connection. In response thereto, the traffic analyzer, at a recording step 72, records the request data for future reference, and then instructs the packet parser (via the traffic tracker) to return the request to the server. Subsequently, at a request-returning step 74, the packet parser (via the NIC) returns the request to the server. (This communication corresponds to third message 48 of FIG. 2.)

Next, as described above with reference to FIG. 2, the server application processes the request, thus generating both a response to the request and at least one corresponding log entry. Both the response and the log entry are then communicated to the LASM. In some cases, the LASM receives the log entry before receiving the response. In other cases, as assumed in FIG. 4, the response is received first. Thus, at a response-receiving step 76, the NIC receives the response packets (corresponding to fourth message 50 of FIG. 2), and passes the packets to the packet parser. Subsequently, at a response-parsing step 78, the packet parser parses the packets such as to identify various data (e.g., source, destination, and session identifiers) specified in the packets, and passes these data to the traffic tracker. Next, at a response-identifying step 80, the traffic tracker identifies (e.g., from the response data) that the packets include a response to a request, matches the response to the preceding request, and passes the request data and response data to the traffic analyzer.

It is noted that the traffic tracker may use any suitable technique to identify the request and the response. For example, the traffic tracker may identify a particular port number, and/or other metadata, that are specified in the request data or response data. Alternatively or additionally, if the request or response is expected to include a particular number of bytes, the traffic tracker may identify the number of bytes specified in the request data or response data. In some cases, the protocol that is used may specify a particular number of bytes, packets, and/or messages between the request and the response. (For example, the protocol may specify that the response immediately follows the request, without any intervening traffic.) In such cases, the traffic tracker may identify the response in response to the number of bytes, packets, and/or messages that intervene between the request and the response.

Subsequently, at a log-receiving step 82, the NIC receives the log entries from the server (or from another source), and passes the log entries to log collector 62. (The log entries are received from the server in fifth message 52 of FIG. 2.) The log collector then passes the log entries to the traffic analyzer, at a log-passing step 84. (Prior to log-receiving step 82, the log collector may request the log entries from the server, via NIC 32.) Alternatively, the log collector may retrieve the log entries directly (e.g., via remote access), and then pass the log to the traffic analyzer.

Next, at a log-entry-identifying step 86, the traffic analyzer uses the request data that were recorded at recording step 72, along with the response data, to identify the at least one log entry that pertains to the response. For example, the traffic analyzer may identify the relevant log entry by matching a session identifier that is included in the request data to a session identifier that is included in the log entry, and/or by matching the time recorded in the response to the time recorded in the log entry.

Subsequently, at a first checking step 88, the traffic analyzer checks if the identified log entry indicates that the request was approved by the server. (Alternatively or additionally to checking the log entry at first checking step 88, the response may be checked, as described above with reference to FIG. 2.) If the request was not approved, the traffic analyzer, at a first instructing step 90, instructs the packet parser (via the traffic tracker) to return the response to the server. Subsequently, at a response-returning step 92, the packet parser (via the NIC) returns the response to the server. (This communication corresponds to sixth message 54 of FIG. 2.)

If, on the other hand, the request was approved, the traffic analyzer sends the details of the request (which typically include at least the identity of the user and, for an access request or authorization request, the name of the requested resource), as ascertained from the log entry, to analysis consumer 63. In response to these details, the analysis consumer—e.g., using the predefined security rules described above with reference to FIG. 2—may implement any suitable security measures. For example, the analysis consumer may first check, at a second checking step 96, whether predefined security rules specify that multifactor authentication (MFA) is required for the user. If MFA is not required, the analysis consumer instructs the packet parser, via the traffic analyzer and traffic tracker, to return the response to server, as described above. Otherwise, the analysis consumer, via NIC 32, instructs a third-party system to request authentication from the user, at a second instructing step 98. Alternatively, the analysis consumer itself may request authentication from the user.

Subsequently, the analysis consumer receives a response from the third-party system via the NIC, at a response-receiving step 100. The analysis consumer then ascertains from the response, at a third checking step 102, whether the requested authentication was received. If yes, the analysis consumer instructs the packet parser, via the traffic analyzer and traffic tracker, to return the response to the request to the server, as described above. Otherwise, the analysis consumer instructs the packet parser, via the traffic analyzer and traffic tracker, to close the connection between the client and the server, at a third instructing step 104. Subsequently, at a connection-closing step 106, the packet parser closes the connection.

In some embodiments, LASM 26 does not comprise analysis consumer 63. Rather, the functionality of analysis consumer 63 is implemented on a third-party system that is in communication with LASM 26, such as a network security system or authentication policy enforcement system. This third-party system may also request authentication from the user, and/or approval from the user's manager, in case such measures are required. Alternatively, the LASM itself may perform such functions (or perform any other relevant function, such as closing the connection between the client and the server), in response to instructions from the third-party system.

It is emphasized that the flow diagram shown in FIG. 4 is provided by way of example only. In practice, many different network-security techniques may be practiced by LASM 26, e.g., as described above with reference to FIG. 2.

It is noted that the embodiments described herein may be useful even in cases in which the request and/or response are unencrypted, in that the log entries may disclose information that is not disclosed in either the request or the response. For example, upon the server identifying that the request originated from a particular user, the server may look up (e.g., in a database) supplementary information, pertaining to the user, that is not included in the request, and then record this supplementary information in the log. (For example, the server may look up, and then record, a full name of the user, contact information for the user, information pertaining to the user's previous requests, or the user's level of seniority in the workplace.) Subsequently, the LASM may use the supplementary information to more effectively render a security decision.

Although the present description relates mainly to protecting network resources, it is noted that the techniques described herein may be used for implementing security measures for any sort of communication session. For example, using any of the techniques described above, the LASM may actively monitor a communication session between two parties. Further to receiving one or more packets that authorize or implement a particular action, the LASM may examine the log entries that relate to the session, while holding the packets. Subsequently, in response to the log entries, the LASM may decide to pass the packets to their intended destination, to close the connection between the parties, to require additional authorization, or to perform any of the other security functions described above.

As a specific example, the LASM may function as a proxy for an HTTPS server that services bank transactions. Subsequently to receiving a message that authorizes a bank transaction, the LASM may examine the log entry that relates to the requested transaction. If the LASM ascertains, from the log entry, that the requested transaction amount is higher than a predefined threshold, and/or identifies other suspicious properties of the request, the LASM may require additional authorization (e.g., from the user who requested the transfer, or from a bank manager), or may simply prevent the message from reaching the server, such that the transaction is not carried out.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description. For example, the techniques described herein may be applied to any communication session between a request-origin device and a request-destination device, in which any of the protocols described herein, or any other protocol, is used to submit a request, such as a request to access to any of the resources described herein or any other resource.

The invention claimed is:

1. A system, comprising:
   a network interface; and
   one or more processors, configured to cooperatively perform a process that includes:
   receiving, via the network interface, a request originating from a request- origin application and directed to a request-destination application that runs on a request-destination device, subsequently to receiving the request, communicating the request to the request-destination device, subsequently to communicating the request to the request-destination device, matching the request to at least one log entry of multiple log entries recorded by the request-destination application by identifying that the log entry was recorded responsively to the request, and receiving a response, from the request-destination application, to the request, while holding the response, identifying, in the at least one log entry, information associated with the request or with the response, and performing a function in response to the information and in accordance with a security rule.

2. The system according to claim 1, wherein the request includes a request to access a resource.

3. The system according to claim 2, wherein the information includes a name of the resource.

4. The system according to claim 1, wherein the request includes an authentication request.

5. The system according to claim 4, wherein the authentication request uses a Kerberos protocol and is encrypted using Flexible Authentication Secure Tunneling (FAST), and wherein the request-destination application includes a Kerberos Key Distribution Center (KDC).

6. The system according to claim 4, wherein the authentication request uses a Netlogon protocol, wherein the request-destination device includes a Domain Controller in a Windows domain, and wherein the request-destination application includes Active Directory Domain Services.

7. The system according to claim 1, wherein the request includes a request to verify that a user is authorized to access a resource.

8. The system according to claim 1, wherein the process further includes, subsequently to communicating the request to the request-destination device, receiving the log entries from the request-destination device.

9. The system according to claim 1, wherein receiving the request includes receiving the request from the request-destination device.

10. The system according to claim 1, wherein the request-origin application runs on a request-origin device, and wherein receiving the request includes receiving the request from the request-origin device.

11. The system according to claim 1, wherein a message selected from the group of messages consisting of: the request, and the response is encrypted, and wherein performing the function includes performing the function without first decrypting the message.

12. The system according to claim 1, wherein performing the function includes, while holding the response, requesting authentication from a user who submitted the request.

13. The system according to claim 1, wherein performing the function includes, while holding the response, requesting approval of the request from an individual other than a user who submitted the request.

14. The system according to claim 1, wherein the process further includes, subsequently to identifying the information, causing the response to be communicated to the request-origin application.

15. The system according to claim 14, wherein causing the response to be communicated to the request-origin application includes communicating the response to the request-destination device for forwarding to the request-origin application.

16. The system according to claim 14, wherein the request-origin application runs on a request-origin device, and wherein causing the response to be communicated to the request-origin application includes communicating the response to the request-origin device.

17. The system according to claim 14, wherein performing the function includes, prior to causing the response to be communicated to the request-origin application, altering the response.

18. The system according to claim 17, wherein the response initially indicates that the request was approved, and wherein altering the response includes altering the response to indicate that the request was denied.

19. The system according to claim 14, wherein the response indicates that the request was approved and allows the request-origin application to access a resource, and wherein performing the function includes, subsequently to causing the response to be communicated to the request-origin application, terminating access of the request-origin application to the resource after a predetermined amount of time.

20. The system according to claim 1, wherein the information includes an identity of a user who submitted the request.

21. The system according to claim 1, wherein the log entry includes a Windows Event Log entry.

22. The system according to claim 1, wherein the process further includes, prior to communicating the request to the request-destination device, recording metadata that are associated with the request, and wherein matching the request to the log entry includes matching the request to the log entry by identifying the recorded metadata in the log entry.

23. The system according to claim 22, wherein the metadata include a session identifier.

24. The system according to claim 1, wherein the process further includes, prior to communicating the request to the request-destination device, modifying the request to include a particular marker, and wherein matching the request to the log entry includes matching the request to the log entry by identifying the particular marker in the log entry.

25. The system according to claim 1, wherein matching the request to the log entry includes matching the request to the log entry by identifying, in the log entry, an identifier of a communication interface via which the request was communicated to the request-destination device.

26. The system according to claim 1, wherein matching the request to the log entry includes matching the request to the log entry by identifying a correspondence between a log-entry time of the log entry and a request-communication time at which the request was communicated to the request-destination device.

27. The system according to claim 1,
wherein the request is a first request, and
wherein the process further includes:
subsequently to communicating the first request, receiving a second request directed to the request-destination device, and
refraining from communicating the second request to the request-destination device before the log entry is entered.

28. The system according to claim 1, wherein the information includes an indication that the request was approved.

29. The system according to claim 28, wherein performing the function includes preventing the response from being communicated to the request-origin application.

30. The system according to claim 29, wherein the request belongs to a communication session, and wherein performing the function further includes causing the communication session to terminate.

31. A system, comprising:
a network interface; and
one or more processors, configured to cooperatively perform a process that includes:
   receiving, from a security application, a request originating from a request-origin application and directed to a request-destination application,
   subsequently to receiving the request, communicating the request to the request-destination application,
   subsequently to communicating the request to the request-destination application, receiving a response, from the request-destination application, to the request,
   communicating the response, and at least one log entry recorded by the request-destination application responsively to the request, to the security application, without communicating the response to the request-origin application,
   receiving the response from the security application, the response including an alteration made by the security application responsively to information in the log entry and in accordance with a security rule, and
   in response to receiving the response from the security application, communicating the response to the request-origin application.

32. The system according to claim 31, wherein the process further includes, prior to receiving the request from the security application:
   receiving the request from the request-origin application, and forwarding the request to the security application.

33. The system according to claim 31, wherein the request uses a Netlogon protocol, and wherein the request-destination application includes Active Directory Domain Services running on a Domain Controller in a Windows domain.

34. A method, comprising:
   receiving a request originating from a request-origin application and directed to a request-destination application that runs on a request-destination device;
   subsequently to receiving the request, communicating the request to the request-destination device;
   subsequently to communicating the request to the request-destination device, matching the request to at least one log entry of multiple log entries recorded by the request-destination application by identifying that the log entry was recorded responsively to the request, and receiving a response, from the request-destination application, to the request;
   while holding the response, identifying, in the at least one log entry, information associated with the request or with the response; and
   performing a function in response to the information and in accordance with a security rule.

35. The method according to claim 34, wherein the request includes an authentication request.

36. The method according to claim 35, wherein the authentication request uses a Kerberos protocol and is encrypted using Flexible Authentication Secure Tunneling (FAST), and wherein the request-destination application includes a Kerberos Key Distribution Center (KDC).

37. The method according to claim 35, wherein the authentication request uses a Netlogon protocol, wherein the request-destination device includes a Domain Controller in a Windows domain, and wherein the request-destination application includes Active Directory Domain Services.

38. The method according to claim 34, wherein a message selected from the group of messages consisting of: the request, and the response is encrypted, and wherein performing the function comprises performing the function without first decrypting the message.

39. The method according to claim 34, wherein performing the function comprises, while holding the response, requesting authentication from a user who submitted the request.

40. The method according to claim 34, wherein the information includes an identity of a user who submitted the request.

41. The method according to claim 34,
wherein the request is a first request, and
wherein the method further comprises:
   subsequently to communicating the first request, receiving a second request directed to the request-destination device; and
   refraining from communicating the second request to the request- destination device before the log entry is entered.

42. A method, comprising:
   receiving, from a security application, a request originating from a request-origin application and directed to a request-destination application;
   subsequently to receiving the request, communicating the request to the request- destination application;
   subsequently to communicating the request to the request-destination application, receiving a response, from the request-destination application, to the request;
   communicating the response, and at least one log entry recorded by the request- destination application responsively to the request, to the security application, without communicating the response to the request-origin application;
   receiving the response from the security application, the response including an alteration made by the security application responsively to information in the log entry and in accordance with a security rule; and
   in response to receiving the response from the security application, communicating the response to the request-origin application.

* * * * *